United States Patent [19]
Bernhardsson et al.

[11] Patent Number: 6,151,298
[45] Date of Patent: Nov. 21, 2000

[54] ELECTRONIC BUS SYSTEM

[75] Inventors: Sture Bernhardsson, Glimåkra; Fredrik Björn, Älmhult; Göran Nilsson, Virestad, all of Sweden

[73] Assignee: NOB Elektronik AB, Älmhult, Sweden

[21] Appl. No.: 09/335,519

[22] Filed: Jun. 18, 1999

Related U.S. Application Data

[63] Continuation of application No. PCT/SE97/02168, Dec. 19, 1997.

[30] Foreign Application Priority Data

Dec. 23, 1996 [SE] Sweden ................................ 9604759

[51] Int. Cl.$^7$ ..................................................... H04L 12/40
[52] U.S. Cl. ........................ 370/225; 370/245; 370/248; 370/463
[58] Field of Search ................................. 370/222, 223, 370/225, 228, 245, 248, 445, 447, 462, 463

[56] References Cited

U.S. PATENT DOCUMENTS 5,469,150  11/1995  Sitte ................................. 340/825.07
5,600,782   2/1997  Thomson ................................. 714/4

FOREIGN PATENT DOCUMENTS

0471630A1    2/1992  European Pat. Off. .
0519712A2   12/1992  European Pat. Off. .
2288522     10/1995  United Kingdom .
WO96/32787  10/1996  WIPO .

*Primary Examiner*—Huy D. Vu
*Assistant Examiner*—Dung Trinh
*Attorney, Agent, or Firm*—Burns, Doane, Swecker & Mathis, L.L.P.

[57] ABSTRACT

An electronic bus system comprises a bus wire (BW) with at least two signal transmission wires (W1, W2) and a left and a right end, which are each defined by a terminating resistor connecting the signal transmission wires to each other. A plurality of electronic control units (ECU–ECUn) are between the two ends of the bus wire (BW) connected to the signal transmission wires (W1, W2) and are adapted, via these, to transmit and receive electric signals. The bus wire (BW) is divided into a plurality of sections (S1–Sn), which are interconnected by means of connecting circuits (CC1–CCn), and forms an annular unit. Each connecting circuit (CC1–CCn) comprises relay means, by means of which each connecting circuit, coordinated with the other connecting circuits, can connect at least one terminating resistor integrated therein, in order to define the left and/or right end of the bus wire (BW).

20 Claims, 4 Drawing Sheets

ELECTRONIC BUS SYSTEM

This is a continuation of International Application No. PCT/SE97/02168, filed Dec. 19, 1997, that designates the United States of America and which claims priority from Swedish Application No. 9604759-2, filed Dec. 23, 1996.

FIELD OF THE INVENTION

The present invention relates to an electronic bus system for stationary or mobile applications, such as a CAN bus system for use in the process industry or in motor vehicles, said system comprising a bus wire with at least two signal transmission wires and a left and a right end, each being defined by a terminating resistor connecting the signal transmission wires to each other, and a plurality of electronic control units, which between the two ends of the bus wire are connected to the signal transmission wires and are adapted to transmit and receive electric signals via said signal transmission wires.

BACKGROUND ART

Electronic bus systems of the above-mentioned type, especially in the form of the so-called CAN bus system, are known from, for instance, private cars, in which the electronic control units are arranged in strategically selected positions in the car, as a rule in connection with a consumer, such as a bulb, which is controlled by the adjoining control unit. This control unit cooperates digitally via the bus wire with other equal control units in the car, the consumer connected thereto being normally supplied with current by a wire which extends in parallel with the bus wire. At the ends of the bus wire so-called terminating resistors are arranged, which serve to damp, at said ends, electric signals transmitted on the bus wire, such that no disturbing echoes arise.

A drawback of the above bus systems is that they have no redundancy, i.e. that even a small defect in the bus wire, for instance a fracture of a signal transmission wire included therein, or in a control unit connected to the signal transmission wire, may result in the function of the entire system being jeopardised. In a private car, the risk of such defects is relatively small thanks to the relatively short stretches of wire and the relatively protected arrangement. In larger vehicles, i.e. working vehicles such as fork lift trucks and lorries, particularly the length of the stretches of wires but also their exposed arrangement often contribute to the arising of such defects.

OBJECT OF THE INVENTION

In view of that stated above, the object of the present invention is to provide in an electronic bus system of the type mentioned by way of introduction, specifically in a CAN bus system, greater redundancy in respect of e.g. wire defects, and in this way enable more reliable bus system installations than before.

SUMMARY OF THE INVENTION

According to the invention, this object is achieved by an electronic bus system of the type mentioned by way of introduction, said bus system being characterised in that the bus wire is divided into a plurality of sections, which are interconnected by means of connecting circuits, and forms an annular unit, that each connecting circuit comprises relay means, by means of which each connecting circuit is adapted, coordinated with the other connecting circuits, to connect at least one of the electronic control units to said signal transmission wires and/or to connect at least one terminating resistor to said signal transmission wires to define the left and/or right end of the bus wire.

By using special connection circuits for the connection of the control units to the bus wire, it will be possible, thanks to the invention, on the one hand to satisfy all protocols for different types of bus systems, i.e. to achieve compatibility therewith, and, on the other hand, to provide extreme redundancy when the connecting circuits render it possible to move the left and right end of the bus wire by selection of the terminating resistor.

Preferably, each connection circuit comprises a left relay means, which is adapted to connect a left terminal of each signal transmission wire to one node each, which is connected to one of the electronic control units, or, coordinated with the other connecting circuits, to a first terminating resistor, a right relay means, which is adapted to connect a right terminal of each signal transmission wire each to one of the nodes or, coordinated with the other connecting circuits, to a second terminating resistor, and a central relay means, which is adapted, when said first or said second terminating resistor is connected, to connect a third terminating resistor to the two other nodes.

A connecting circuit designed in this manner is of a very simple design and can easily and at low cost be implemented by means of prior-art semiconductor technology.

Alternatively, according to the invention, each connecting circuit may comprise a first link relay means, which is adapted to connect a left terminal of each signal transmission wire to one node each, which is connected to one of the electronic control units, a first right relay means, which is adapted to connect a right terminal of each signal transmission wire each to ore of the nodes, a second left relay means, which is adapted, coordinated with the other connecting circuits, to connect the left terminals to a left terminating resistor, and a second right relay means, which is adapted, coordinated with the other connecting circuits, to connect the right terminals to a right terminating resistor.

A connecting circuit designed in this manner serves the same purpose as the above-mentioned preferred connecting circuit, but will be somewhat more expensive since it comprises an additional relay means, which besides, like the other relay means, must be controllable individually.

Preferably, according to the invention, the switching of the relay means in the connecting circuits is controlled by a control means in each connecting circuit, which control means, via the electronic control unit connected to the connecting circuit, cooperates with corresponding control means in the other connecting circuits.

It will be appreciated that also this solution further increases the desired redundancy since it contributes to a greater independence between the connecting circuits.

The bus wire of the electronic bus system according to the invention suitably comprises a wire for supplying current to connected consumers, such as an electronic control unit and a bulb or the like connected thereto, and each connecting circuit comprises a left current terminal which is connected to the wire in the section of the bus wire to the left of the connecting circuit, a right current terminal, which is connected to the were in the section of the bus wire to the right of the connecting circuit, a switch means, which is adapted to connect the current terminals to each other or disconnect them from each other, a first connecting means for one-way supply of current to the consumer from the left current terminal, a second connecting means for one-way supply of current to the consumer from the right current terminal, a first voltage sensing means for sensing the voltage across the left current terminal, and a second voltage sensing means for sensing the voltage across the right current terminal, the switch means being adapted to disconnect the current terminals from each other in case of a voltage drop sensed with the aid of the voltage sensing means and again connect the current terminals to each other when normal voltage is again applied across the two current terminals.

It is per se known to lay also a wire in parallel with the signal transmission wires of the bus wire, but combining in the inventive manner such wiring with the special connecting circuits in the inventive bus system no doubt implies a considerable technical improvement.

Preferably, the switching of the switch means is controlled by a control means in each connecting circuit, said control means cooperating, via the electronic control unit connected to the connecting circuit, with corresponding control means in the other connecting circuits.

Also for this solution, increased redundancy is in the forefront, to which redundancy the solution contributes by virtue of a greater independence between the connecting circuits of the bus system.

Finally, if desired, in the inventive electronic bus system at least one electronic control unit can be connected directly to the bus wire in at least one of the sections.

The advantage of this solution is that it makes it possible to reduce the cost of the inventive bus system, even if this occurs at the expense of the fact that the electronic control unit connected in this manner ceases to operate if the associated section, in case of a wire defect, gets into the break between the two connected terminating resistors.

BRIEF DESCRIPTION OF THE DRAWINGS

Two embodiments of the invention will now be described in more detail with reference to the accompanying drawings, in which FIG. 1 schematically illustrates an annular bus system according to the invention.

DESCRIPTION OF TWO EMBODIMENTS

CAN is a standardised method of interconnecting electronic control units ECU to a system which is especially developed for the vehicle industry. In a CAN system, a number of electronic units ECU always exchange in a digital manner information via a bus wire consisting of a two-wire cable. The bus wire has a certain impedance about 120 ohm, which depends on the design of the cable. When a signal from a control unit ECU is transmitted on the wire, it continues along this as long as the impedance does not change. At the end of the wire there is normally a resistor, which is called terminating resistor. Without such a resistor, the signal is reflected and returns with full strength, which may cause distortion of the digital message. When the terminating resistor is correctly connected, the signal is absorbed without the arising of any reflex whatever. It is therefore important that the bus wire has a terminating resistor in both ends. The importance of these resistors besides increases with the cable length and the transmission rate (bit/s).

In a ring main system, the electronic control units are arranged in a ring, which results in two signal paths between two arbitrary control units ECU in the ring. In the protocol for the CAN system, there are no possibilities of providing a closed ring, i.e. building a ring main system. The drawback is that a CAN bus system is normally fully knocked out in case of short circuit or break in the bus wire. This is not acceptable in systems installed in equipment requiring high availability.

The absence of terminating resistors is normally managed with a reduced function, which means that more or less intermittent defects arise. Since the terminating resistors are arranged in the ends of the bus wire, a frequent mistake is that they are forgotten in connection with mounting or service.

A defect in the cable means that the function involved is knocked out and that the other units will be blocked. The system cannot on its own diagnose the defect. Dividing the bus wire into sections, where a defect in a section knocks out only the section involved, is not possible by means of the electronic control units ECU themselves.

In a CAN system containing electronic control units ECU with a relatively moderate power consumption, a wire (positive feeding) is often laid in the same cable as the bus wire. This is certainly practical but unfortunately also means that short-circuiting to earth in this wire puts the entire system out of operation.

Figure 1:
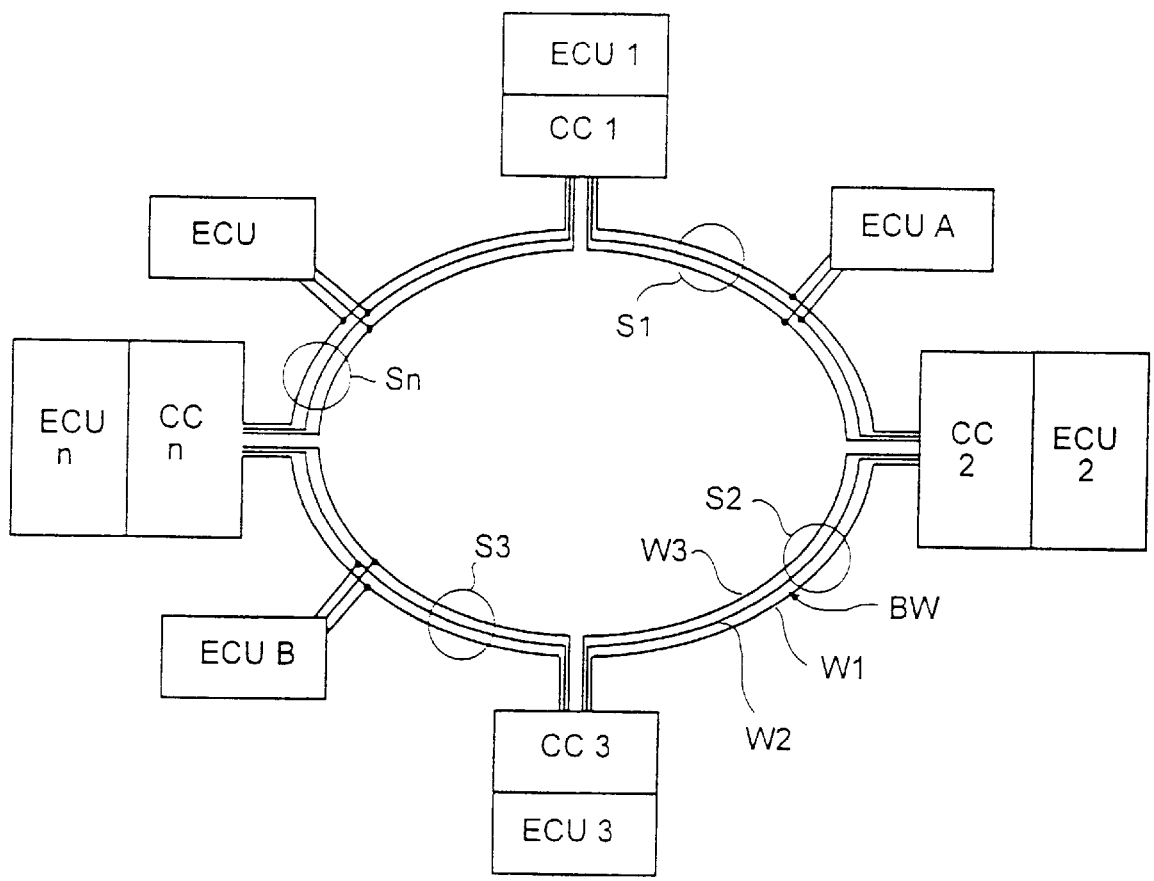

As is evident, the electronic bus system shown in FIG. 1 is externally a ring main system, but it still satisfies all system requirements according to the CAN protocol. This is possible thanks to the fact that several electronic control units ECU1–ECUn included in the system are not directly connected to the bus wire BW. Instead a plurality of connecting circuits CC1–CCn described in more detail below are connected between the control units ECU1–ECUn and the bus wire BW, said connecting circuits CC1–CCn dividing the bus wire BW into a plurality of sections S1–Sn which are independent of each other. If desired, in the sections S1–Sn electronic control units ECUA, ECUB, ECUC can, however, be connected in a traditional manner directly to the two signal transmission wires W1, W2 of the bus wire BW and its wire W3 (positive feeding).

The advantage of the connecting circuits CC1–CCn is that they control how the bus wire BW is connected. A connecting circuit CC1–CCn thus breaks up the ring in a program-controlled manner in an arbitrary electronic control unit ECU1–ECUn and there connects terminating resistors, thereby forming a conventional bus wire BW with terminating resistors in both ends. When a defect arises in the open ring thus accomplished, the connecting circuits CC1–CCn test the bus wire BW by seeking contact with their neighbours. The connecting circuits CC1–CCn which are closest to the defect then disconnects the defective section S1–Sn and notifies the other connecting circuits CC1–CCn that there is a defect in the system. The traffic then continues as usual, but without using the defective section S1–Sn.

With respect to FIG. 1, this would mean, in case of a defect in section S1, that both the electronic control unit ECU1 and the electronic control unit ECU2, which are positioned on both sides of the defective section S1, continue to operate normally, whereas the directly connected electronic control unit ECUa positioned between them ceases to operate.

Figure 2:
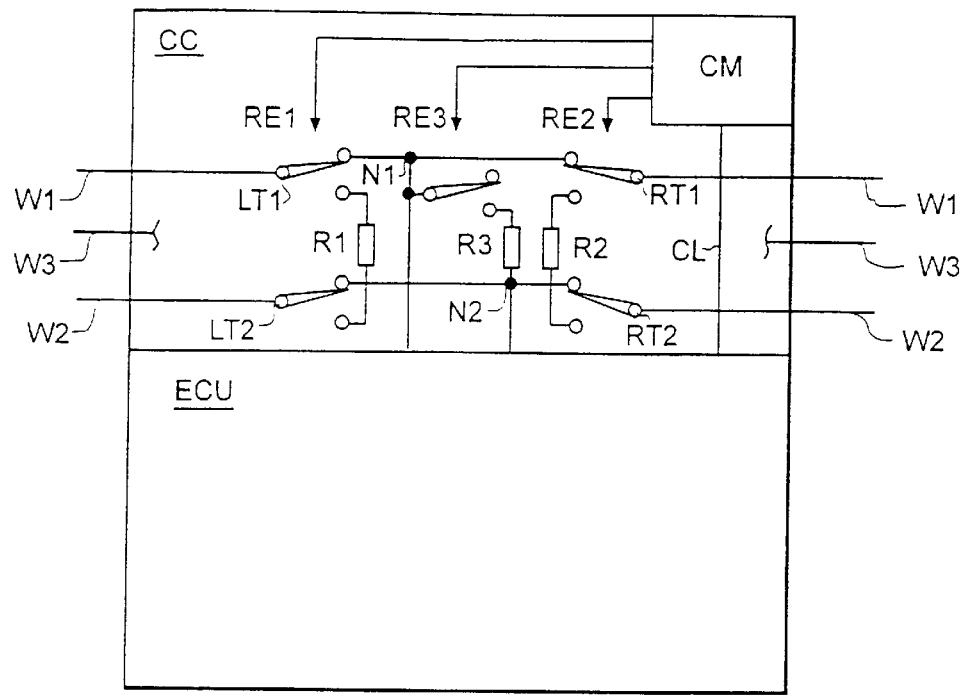
FIG. 2 shows a circuit diagram for a part of a first embodiment of a connecting circuit in a resting position.

The function of the connecting circuits CC1–CCn will be explained in more detail below, first with reference to FIGS. 2–4. These Figures show a connecting circuit CC which comprises a left switch RE1, which is adapted to connect a link terminal LT1, LT2 of each signal transmission wire W1, W2 to one node N1, N2 each which is connected to an electronic control unit, or to a first terminating resistor R1. Moreover, the connecting circuit CC comprises a right switch RE2, which is adapted to connect a right terminal RT1, RT2 of each signal transmission wire W1, W2 each to one of the nodes N1, N2 or to a second terminating resistor, and a central switch RE3, which is adapted, when the first or the second terminating resistor R1, R2 is connected, to connect a third terminating resistor R3 to the two nodes N1, N2. In addition to the components mentioned, the connecting circuit CC also comprises a control circuit CM, which via a separate control wire CM cooperates with the electronic control unit ECU connected to the connecting circuit CC and controls the switching position of the switches RE1–RE3.

A connecting circuit CC thus composed can occupy three different switching positions. The first of these positions is shown in FIG. 2 and is suitably referred to as resting position. In the resting position, the switches RE1, RE2 connect the signal transmission wires W1, W2 to the two nodes N1, N2, and none of the three terminating resistors R1–R3 is connected. The electronic control unit ECU connected to the connecting circuit CC can thus freely cooperate with corresponding electronic control units ECU both to the left and to the right.

Figure 3:
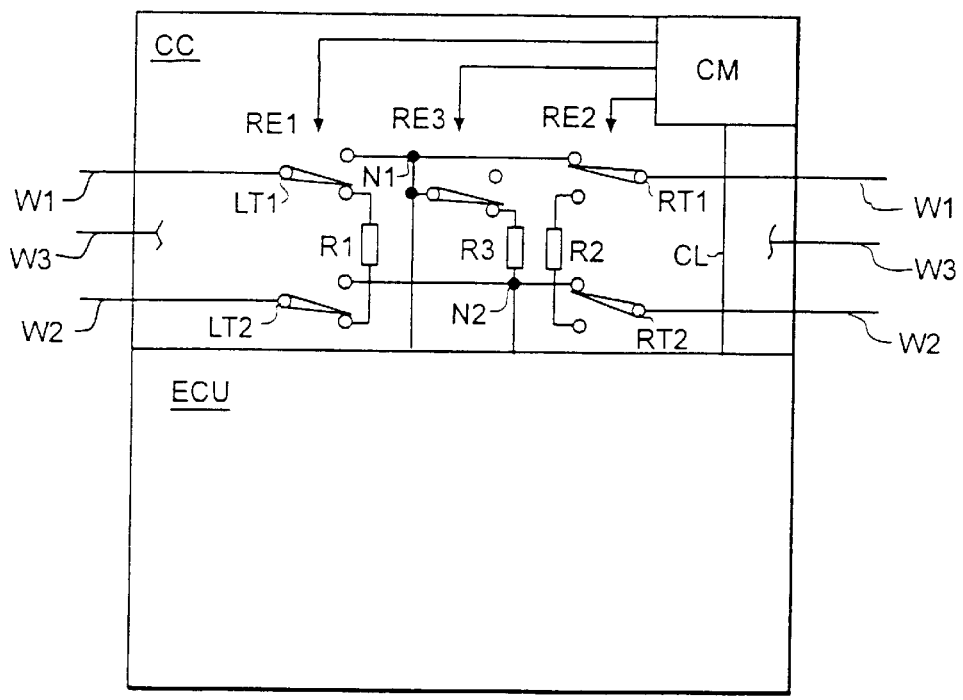
FIG. 3 shows the connecting circuit in FIG. 2 in a left terminating position.

FIG. 3 shows a so-called left terminating position. In the left terminating position, the switch RE1 connects the bus wires W1, W2 coming from the left to the terminating resistor R1, the switch RE2 occupies the same position as in FIG. 2 and the switch RE3 connects the terminating resistor R3 to the two nodes N1, N2. In this position, the electronic control unit ECU connected to the connecting circuit CC can alone be responsible either for the two terminating resistors R1, R3 of the bus wire BW or only for the left terminating resistor R3 of the bus wire BW if there is a defect to the left of the connecting circuit CC and the signal transmission wires W1, W2 to the left of the connecting circuit CC therefore have been disconnected by means of the switch RE1.

Figure 4:
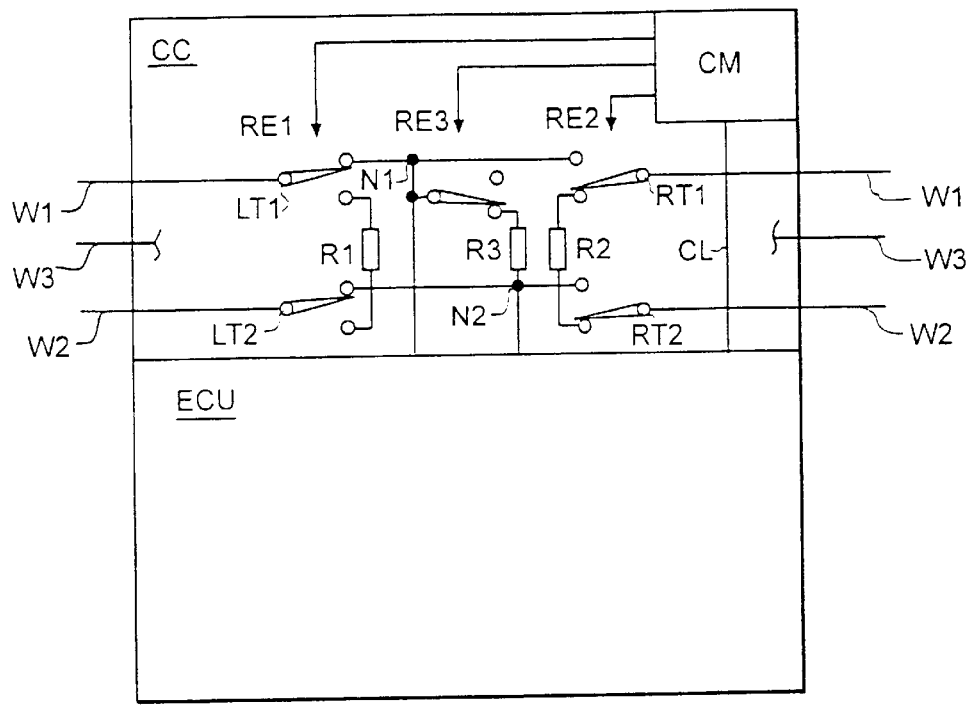
FIG. 4 shows the connecting circuit in FIG. 2 in a right terminating position.

FIG. 4 shows a so-called right terminating position. In the right terminating position, the switch RE2 connects the bus wires W1, W2 coming from the right to the terminating resistor R2, the switch RE1 occupies the same position as in FIG. 2, and the switch RE3 connects the terminating resistor R3 to the two nodes N1, N2. In this position, the electronic control unit ECU connected to the connecting circuit CC can alone be responsible either for the two terminating resistors R1, R3 of the bus wire BW or only for the right terminating resistor R3 of the bus wire BW if there is a defect to the right of the connecting circuit CC and the signal transmission wires W1, W2 to the right of the connecting circuit CC therefore have been disconnected by means of the switch RE2.

Figure 5:
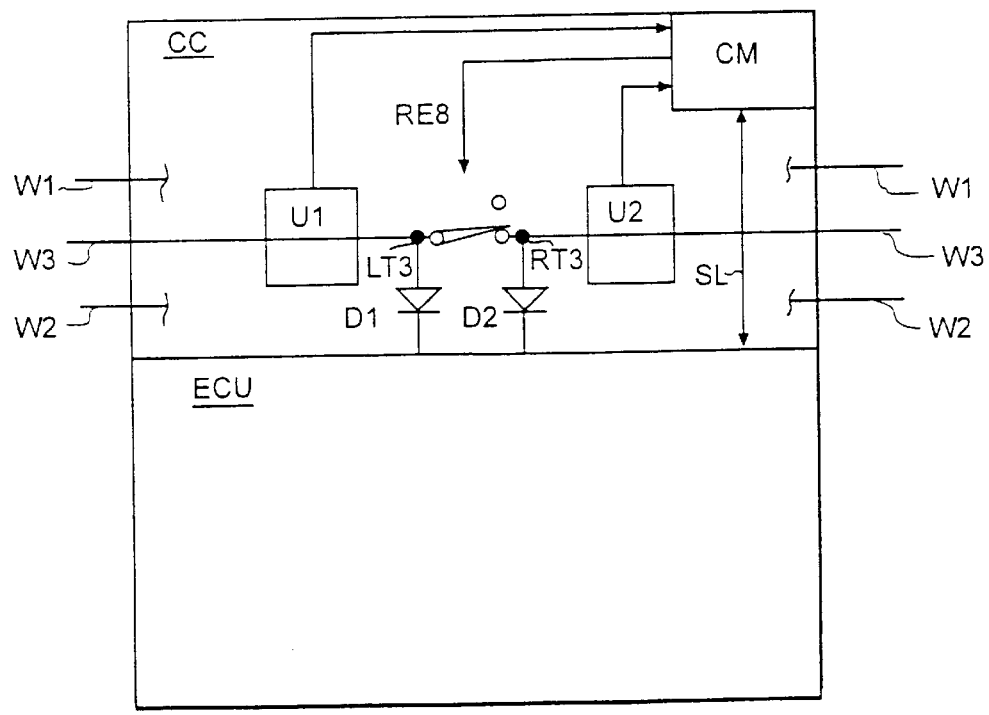
FIG. 5 shows a circuit diagram for another part of the connecting circuit in FIG. 2 in a resting position.
Figure 6:
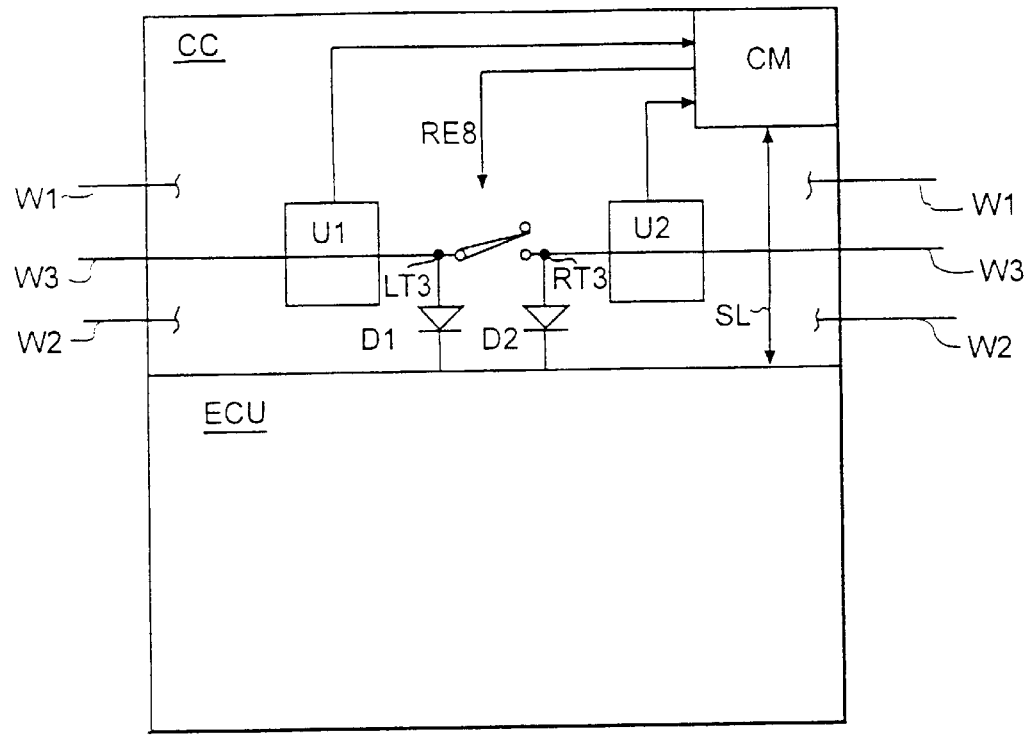
FIG. 6 shows the connecting circuit in FIG. 5 in an opening position.

FIGS. 5 and 6 show the power unit of the connecting circuit CC in a resting position (FIG. 5) and in an opening position (FIG. 6). The power unit is usable when the bus wire BW comprises a wire W3 for supplying the connected consumers, such as an electronic control unit ECU and a bulb or the like connected thereto. The power unit comprises a left current terminal LT3, which is connected to the wire W3 in the section S1–Sn of the bus wire BW to the left of the connecting circuit CC and a right current terminal RT3, which is connected to the wire W3 in the section S1–Sn of the bus wire BW to the right of the connecting circuit CC. The power unit of the connecting circuit CC further comprises a switch RE8, a first diode D1 for one-way current supply to the consumer from the left current terminal LT3 and a second diode D2 for one-way current supply to the consumer from the right current terminal RT3. A first voltage sensing means U1 senses the voltage across the left current terminal LT3 and a second voltage sensing means U2 senses the voltage across the right current terminal RT3, the sensing means U1, U2 transmitting the sensed voltage values to the control circuit CM of the connecting circuit CC, which control circuit is also adapted to control the switch RE8.

Normally there is voltage on both sides of the switch RE8, and the control circuit CM holds the switch RE8 closed, i.e. the left and the right current terminal LT3, RT3 are connected to each other, as is evident from FIG. 5.

In case of a short circuit on either side, the voltage disappears simultaneously on both sides since the switch RE8 is closed. The voltage sensing means U1, U2 sense the voltage drop and make the control circuit CM immediately open the switch RE8. This makes the voltage return on the side that is not short-circuited and the consumer connected to the power unit of the connecting circuit CC being one-way supplied via one of the two diodes D1, D2, while the other of the two diodes D1, D2 reliably insulates the short-circuited section S1–Sn from the rest of the bus system. Of course the switch RE8 is immediately closed again when the voltage returns on the short-circuited side.

Since suitably the same control circuit CM is used both to control the connection of the terminating resistors R1–R3 and the switching of the switch RE8, a person skilled in the art realises that it is very easy to coordinate, in a program-controlled manner, the various components of the bus system to a working unit by means of the electronic control units ECU of the bus system via a signal line SL.

Figure 7:
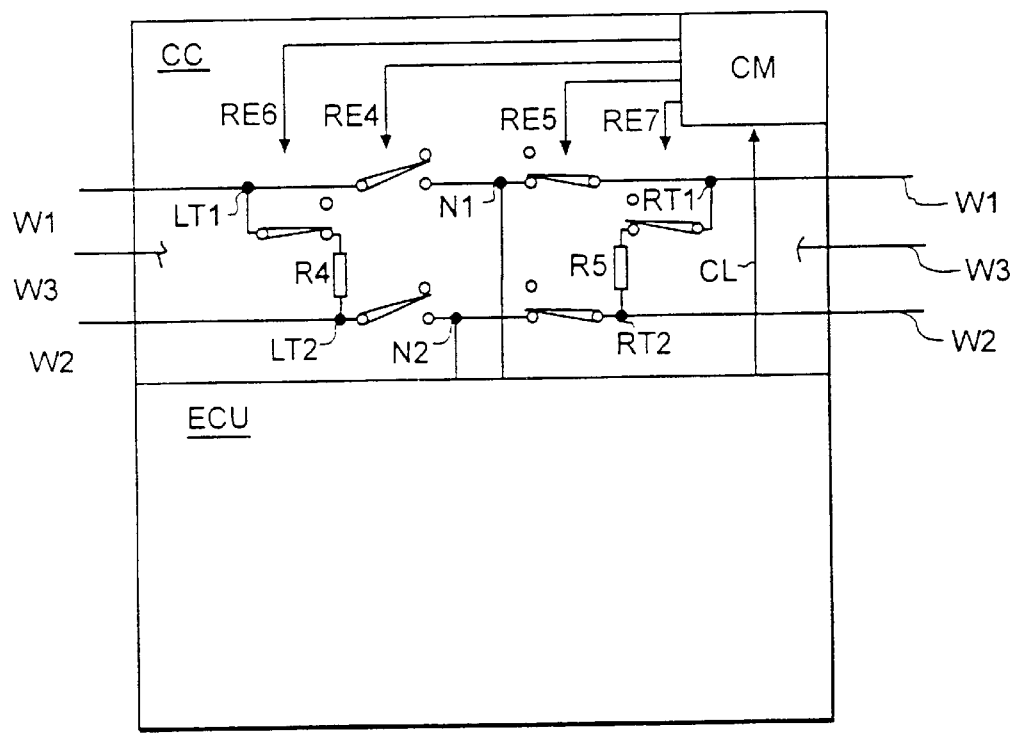
FIG. 7 shows a circuit diagram for a part of a second embodiment of a connecting circuit in a left terminating position.

Finally, FIG. 7 shows an alternative embodiment of a connecting circuit CC in its left terminating position. The connecting circuit CC in FIG. 7 comprises a first left switch RE4, which is adapted to connect a left terminal LT1, LT2 of each signal transmission wire W1, W2 to one node N1, N2 each, which is connected to an electronic control unit ECU. The connecting circuit CC also comprises a first right switch RE5 which is adapted to connect a right terminal RT1, RT2 of each signal transmission wire W1, W2 each to one of the nodes N1, N2. A second left switch RE6 is adapted to connect the left terminals LT1, LT2 to a left terminating resistor R4, and a second right switch RE7 is adapted to connect the right terminals RT1, RT2 to a right terminating resistor. Also in this connecting circuit CC, the switches RE4–RE7 are switched by means of a control circuit CM, which via a control line CL cooperates with the control unit ECU connected to the connecting circuit CC.

In their resting position (not shown), the switches RE4, RE5 of the connecting circuit CC are closed and its switches RE6, RE7 are open. In the shown left terminating position, however, the switch RE4 is open and the two switches RE5–RE7 are closed. Electrically seen, this position fully corresponds to the left terminating position described above in connection with FIG. 3. The right terminating position of the circuit CC differs from the left terminating position only by the fact that instead the switch RE5 is open while the switch RE4 is closed.

Finally it should be pointed out that the expressions left and right which are chosen in this specification and in the claims and the abstract, of course, do not relate to actual physical conditions, but only the conditions in FIGS. 2–7, and that they are only intended to facilitate the description of the invention.

What is claimed is:

1. An electronic bus system for stationary or mobile applications, such as a CAN bus system for use in the process industry or in motor vehicles, said system comprising a bus wire (BW) with at least two signal transmission wires (W1, W2) and a left and a right end, each being defined by a terminating resistor (R1–R3; R4, R5) connecting the signal transmission wires (W1, W2) to each other, and a plurality of electronic control units (ECU, ECU1–ECUn), which between the two ends of the bus wire (BW) are connected to the signal transmission wires (W1, W2) and are adapted to transmit and receive electric signals via said signal transmission wires, characterised in that the bus wire (BW) is divided into a plurality of sections (S1–Sn), which are interconnected by means of connecting circuits (CC, CC1–CCn), and forms an annular unit, that each connecting circuit (CC, CC1–CCn) comprises relay means (RE1–RE3; RE4–RE7), by means of which each connecting circuit (CC, CC1–CCn) is adapted, coordinated with the other connecting circuits (CC, CC1–CCn), to connect at least one of the electronic control units (ECU, ECU1–ECUn) to said signal transmission wires (C1, W2) and/or to connect at least one terminating resistor (R1–R3; R4, R5) to said signal transmission wires (W1, W2) to define the left and/or right end of the bus wire (BW).

2. A system as claimed in claim 1, characterised in that each connecting circuit (CC, CC1–CCn) comprises a left relay means (RE1), which is adapted to connect a left terminal (LT1, LT2) of each signal transmission wire (W1, W2) to one node (N1, N2) each, which is connected to one of the electronic control units (ECU, ECU1–ECUn), or, coordinated with the other connecting circuits (CC, CC1–CCn), to a first terminating resistor (R1), a right relay means (RE2), which is adapted to connect a right terminal (RT1, RT2) of each signal transmission wire (W1, W2) each to one of the nodes (N1, N2) or, coordinated with the other connecting circuits (CC, CC1–CCn), to a second terminating resistor (R2), and a central relay means (RE3), which is adapted, when said first or said second terminating resistor (R1, R2) is connected, to connect a third terminating resistor (R3) to said two nodes (N1, N2).

3. A system as claimed in claim 1, characterised in that each connecting circuit (CC, CC1–CCn) comprises a first link relay means (RE4), which is adapted to connect a left terminal (LT1, LT2) of each signal transmission wire (W1, W2) to one node (N1, N2) each, which is connected to one of said electronic control units (ECU, ECU1–ECUn), a first right relay means (RE5), which is adapted to connect a right terminal (RT1, RT2) of each signal transmission wire (W1, W2) each to one of said nodes (N1, N2) a second left relay means (RE6), which is adapted, coordinated with the other connecting circuits (CC, CC1–CCn), to connect the left terminals (LT1, LT2) to a left terminating resistor (R4), and a second right relay means (RE7), which is adapted, coordinated with the other connecting circuits (CC, CC1–CCn), to connect the right terminals (RT1, RT2) to a right terminating resistor (R5).

4. A system as claimed in claim 1 characterised in that the switching of the relay means (RE1–RE3; RE4–RE7) in the connecting circuits (CC, CC1–CCn) is controlled by a control means (CM) in each connecting circuit (CC, CC1–CCn), which control means (CM), via the electronic control unit (ECU, ECU1–ECUn) connected to the connecting circuit (CC, CC1–CCn), cooperates (CL) with corresponding control means (CM) in the other connecting circuits (CC, CC1–CCn).

5. A system as claimed in claim 1, characterised in that the bus wire (BW) comprises a wire (W3) for supplying current to connected consumers, such as an electronic control unit (ECU, ECU1–ECUn) and a bulb or the like connected thereto, and that each connecting circuit (CC, CC1–CCn) comprises a left current terminal (LT3) which is connected to the wire (W3) in the section (S1–Sn) of the bus wire (BW) to the left of the connecting circuit (CC, CC1–CCn), a right current terminal (RT3), which is connected to the wire (W3) in the section (S1–Sn) of the bus wire (BW) to the right of the connecting circuit (CC, CC1–CCn), a switch means (RE8), which is adapted to connect the current terminals (LT3, RT3) to each other or disconnect them from each other, a first connecting means (T1) for one-way supply of current to the consumer from the left current terminal (LT3), a second connecting means (T2) for one-way supply of current to the consumer from the right current terminal (RT3), a first voltage sensing means (U1) for sensing the voltage across the left current terminal (LT3), and a second voltage sensing means (U2) for sensing the voltage across the right current terminal (RT3), the switching means (RE8) being adapted to disconnect the current terminals (LT3, RT3) from each other in case of a voltage drop sensed with the aid of the voltage sensing means (U1, U2) and again connect the current terminals (LT3, RT3) to each other when normal voltage is again applied across the two current terminals (LT3, RT3).

6. A system as claimed in claim 5, characterised in that the switching of the switch means (RE8) is controlled by a control means (CM) in each connecting circuit (CC, CC1–CCn), said control means (CM) cooperating (SL), via the electronic control unit (ECU, ECU1–ECUn) connected to the connecting circuit (CC, CC1–CCn), with corresponding control means (CM) in the other connecting circuits (CC, CC1–CCn).

7. A system as claimed in claim 1, characterised in that at least one electronic control unit (ECUA, ECUB, ECUC) is connected directly to the bus wire (BW) in at least one of the sections (S1–Sn).

8. A system as claimed in claim 2, characterised in that the switching of the relay means (RE1–RE3; RE4–RE7) in the connecting circuits (CC, CC1–CCn) is controlled by a control means (CM) in each connecting circuit (CC, CC1–CCn), which control means (CM), via the electronic control unit (ECU, ECU1–ECUn) connected to the connecting circuit (CC, CC1–CCn), cooperates (CL) with corresponding control means (CM) in the other connecting circuits (CC, CC1–CCn).

9. A system as claimed in claim 3, characterised in that the switching of the relay means (RE1–RE3; RE4–RE7) in the connecting circuits (CC, CC1–CCn) is controlled by a control means (CM) in each connecting circuit (CC, CC1–CCn), which control means (CM), via the electronic control unit (ECU, ECU1–ECUn) connected to the connecting circuit (CC, CC1–CCn), cooperates (CL) with corresponding control means (CM) in the other connecting circuits (CC, CC1–CCn).

10. A system as claimed in claim 2, characterised in that the bus wire (BW) comprises a wire (W3) for supplying current to connected consumers, such as an electronic control unit (ECU, ECU1–ECUn) and a bulb or the like connected thereto, and that each connecting circuit (CC, CC1–CCn) comprises a left current terminal (LT3) which is connected to the wire (W3) in the section (S1–Sn) of the bus wire (BW) to the left of the connecting circuit (CC, CC1–CCn), a right current terminal (RT3), which is connected to the wire (W3) in the section (S1–Sn) of the bus wire (BW) to the right of the connecting circuit (CC, CC1–CCn), a switch means (RE8), which is adapted to connect the current terminals (LT3, RT3) to each other or disconnect them from each other, a first connecting means (T1) for one-way supply of current to the consumer from the left current terminal (LT3), a second connecting means (T2) for one-way supply of current to the consumer from the right current terminal (RT3), a first voltage sensing means (U1) for sensing the voltage across the left current terminal (LT3), and a second voltage sensing means (U2) for sensing the voltage across the right current terminal (RT3), the switching means (RE8) being adapted to disconnect the current terminals (LT3, RT3) from each other in case of a voltage drop sensed with the aid of the voltage sensing means (U1, U2) and again connect the current terminals (LT3, RT3) to each other when normal voltage is again applied across the two current terminals (LT3, RT3).

11. A system as claimed in claim 3, characterised in that the bus wire (BW) comprises a wire (W3) for supplying current to connected consumers, such as an electronic control unit (ECU, ECU1–ECUn) and a bulb or the like connected thereto, and that each connecting circuit (CC, CC1–CCn) comprises a left current terminal (LT3) which is connected to the wire (W3) in the section (S1–Sn) of the bus wire (BW) to the left of the connecting circuit (CC, CC1–CCn), a right current terminal (RT3), which is connected to the wire (W3) in the section (S1–Sn) of the bus wire (BW)to the right of the connecting circuit (CC, CC1–CCn), a switch means (RE8), which is adapted to connect the current terminals (LT3, RT3) to each other or disconnect them from each other, a first connecting means (T1) for one-way supply of current to the consumer from the left current terminal (LT3), a second connecting means (T2) for one-way supply of current to the consumer from the right current terminal (RT3), a first voltage sensing means (U1) for sensing the voltage across the left current terminal (LT3), and a second voltage sensing means (U2) for sensing the voltage across the right current terminal (RT3), the switching means (RE8) being adapted to disconnect the current terminals (LT3, RT3) from each other in case of a voltage drop sensed with the aid of the voltage sensing means (U1, U2) and again connect the current terminals (LT3, RT3) to each other when normal voltage is again applied across the two current terminals (LT3, RT3).

12. A system as claimed in claim 4, characterised in that the bus wire (BW) comprises a wire (W3) for supplying current to connected consumers, such as an electronic control unit (ECU, ECU1–ECUn) and a bulb or the like connected thereto, and that each connecting circuit (CC, CC1–CCn) comprises a left current terminal (LT3) which is connected to the wire (W3) in the section (S1–Sn) of the bus wire (BW) to the left of the connecting circuit (CC, CC1–CCn), a right current terminal (RT3), which is connected to the wire (W3) in the section (S1–Sn) of the bus wire (BW)to the right of the connecting circuit (CC, CC1–CCn), a switch means (RE8), which is adapted to connect the current terminals (LT3, RT3) to each other or disconnect them from each other, a first connecting means (T1) for one-way supply of current to the consumer from the left current terminal (LT3), a second connecting means (T2) for one-way supply of current to the consumer from the right current terminal (RT3), a first voltage sensing means (U1) for sensing the voltage across the left current terminal (LT3), and a second voltage sensing means (U2) for sensing the voltage across the right current terminal (RT3), the switching means (RE8) being adapted to disconnect the current terminals (LT3, RT3) from each other in case of a voltage drop sensed with the aid of the voltage sensing means (U1, U2) and again connect the current terminals (LT3, RT3) to each other when normal voltage is again applied across the two current terminals (LT3, RT3).

13. A system as claimed in claim 8, characterised in that the bus wire (BW) comprises a wire (W3) for supplying current to connected consumers, such as an electronic control unit (ECU, ECU1–ECUn) and a bulb or the like connected thereto, and that each connecting circuit (CC, CC1–CCn) comprises a left current terminal (LT3) which is connected to the wire (W3) in the section (S1–Sn) of the bus wire (BW) to the left of the connecting circuit (CC, CC1–CCn), a right current terminal (RT3), which is connected to the wire (W3) in the section (S1–Sn) of the bus wire (BW) to the right of the connecting circuit (CC, CC1–CCn), a switch means (RE8), which is adapted to connect the current terminals (LT3, RT3) to each other or disconnect them from each other, a first connecting means (T1) for one-way supply of current to the consumer from the left current terminal (LT3), a second connecting means (T2) for one-way supply of current to the consumer from the right current terminal (RT3), a first voltage sensing means (U1) for sensing the voltage across the left current terminal (LT3), and a second voltage sensing means (U2) for sensing the voltage across the right current terminal (RT3), the switching means (RE8) being adapted to disconnect the current terminals (LT3, RT3) from each other in case of a voltage drop sensed with the aid of the voltage sensing means (U1, U2) and again connect the current terminals (LT3, RT3) to each other when normal voltage is again applied across the two current terminals (LT3, RT3).

14. A system as claimed in claim 9, characterised in that the bus wire (BW) comprises a wire (W3) for supplying current to connected consumers, such as an electronic control unit (ECU, ECU1–ECUn) and a bulb or the like connected thereto, and that each connecting circuit (CC, CC1–CCn) comprises a left current terminal (LT3) which is connected to the wire (W3) in the section (S1–Sn) of the bus wire (BW) to the left of the connecting circuit (CC, CC1–CCn), a right current terminal (RT3), which is connected to the wire (W3) in the section (S1–Sn) of the bus wire (BW) to the right of the connecting circuit (CC, CC1–CCn), a switch means (RE8), which is adapted to connect the current terminals (LT3, RT3) to each other or disconnect them from each other, a first connecting means (T1) for one-way supply of current to the consumer from the left current terminal (LT3), a second connecting means (T2) for one-way supply of current to the consumer from the right current terminal (RT3), a first voltage sensing means (U1) for sensing the voltage across the left current terminal (LT3), and a second voltage sensing means (U2) for sensing the voltage across the right current terminal (RT3), the switching means (RE8) being adapted to disconnect the current terminals (LT3, RT3) from each other in case of a voltage drop sensed with the aid of the voltage sensing means (U1, U2) and again connect the current terminals (LT3, RT3) to each other when normal voltage is again applied across the two current terminals (LT3, RT3).

15. A system as claimed in claim 2, characterised in that at least one electronic control unit (ECUA, ECUB, ECUC)

is connected directly to the bus wire (BW) in at least one of the sections (S1–Sn).

16. A system as claimed in claim 3, characterised in that at least one electronic control unit (ECUA, ECUB, ECUC) is connected directly to the bus wire (BW) in at least one of the sections (S1–Sn).

17. A system as claimed in claim 4, characterised in that at least one electronic control unit (ECUA, ECUB, ECUC) is connected directly to the bus wire (BW) in at least one of the sections (S1–Sn).

18. A system as claimed in claim 5, characterised in that at least one electronic control unit (ECUA, ECUB, ECUC) is connected directly to the bus wire (BW) in at least one of the sections (S1–Sn).

19. A system as claimed in claim 6, characterised in that at least one electronic control unit (ECUA, ECUB, ECUC) is connected directly to the bus wire (BW) in at least one of the sections (S1–Sn).

20. A system as claimed in claim 8, characterised in that at least one electronic control unit (ECUA, ECUB, ECUC) is connected directly to the bus wire (BW) in at least one of the sections (S1–Sn).

* * * * *